United States Patent Office 2,779,136
Patented Jan. 29, 1957

2,779,136

METHOD OF MAKING A GLASS ARTICLE OF HIGH MECHANICAL STRENGTH AND ARTICLE MADE THEREBY

Harrison P. Hood and Stanley D. Stookey, Corning, N. Y., assignors to Corning Glass Works, Corning, N. Y., a corporation of New York No Drawing. Application July 6, 1955,
Serial No. 520,374

15 Claims. (Cl. 49—79)

This invention relates to the production of glass articles having high mechanical strength by providing them with a stress of substantially uniform compression in the surface and parallel therewith.

Such a compressional surface stress heretofore has usually been produced by tempering, that is, by heating the glass article and then suddenly cooling it. A glass article formed by any method may be tempered, but the increased strength so attained is not permanent and may be lost if the article is heated too long at elevated temperatures well below its annealing range. The maximum tensile strength of an abraded tempered glass article does not normally exceed about 10,000–12,000 pounds per square inch as compared to an abraded, annealed glass article, the tensile strength of which is approximately 5,000–6,000 pounds per square inch.

The term "tensile strength" as used herein refers to the transverse strength of a rod or bar of known cross section and is measured in the conventional manner by supporting the rod or bar across two definitely spaced knife edges, loading it on a second pair of knife edges resting on it in uniformly spaced relation between the first two knife edges until breakage of the rod or bar occurs, and calculating the number of pounds per square inch of cross section required to cause breakage.

A permanent surface compressional stress, which cannot be removed by heating, can be provided by the method known as "casing" which, as heretofore practiced, comprises covering an initial gather of one glass with a gather of another glass having a lower thermal expansion coefficient than the first and then expanding the double gather by blowing. When the expanded glass article is cooled, the inner portion having the higher thermal expansion coefficient tends to contract more than the surface layer thereby producing a permanent surface compressional stress together with an internal tensional counter-stress.

While such method is effective for the production of blown glass articles and, to a less extent, articles made by rolling and by drawing, it is not practicable for articles formed by gob feeding. A strengthened glass article so made possesses an inherent zone of weakness where it was severed from the moil or other portion and its tensile strength is variable and does not at the best exceed the strength of tempered glass articles. The sharp boundary at the junction of the two glasses limits the maximum useful stress which can be maintained without exceeding the breaking strength of the joint and close control of the thermal expansion coefficients of the glasses and the difference between them is required.

We have now discovered a novel method of casing a glass article with a surface layer of lower thermal expansion coefficient than its interior, whereby such difficulties may be overcome and glass articles may be produced having tensile strengths in excess of 15,000 pounds per square inch and amounting in some instances to as much as 70,000 or more pounds per square inch. Moreover, the new method is applicable to glass articles formed by blowing, pressing, drawing, rolling, and other known methods.

The method according to the invention comprises forming an article of glass containing 45% to 80% $SiO_2$ and 7% to 25% of at least one of the alkali metal oxides of $Na_2O$ and $K_2O$, contacting the article while at a temperature above its strain point but below its softening point with a lithium salt which will be molten but which will not decompose objectionably at such temperature, and maintaining the article in contact with the salt at said temperature for a time sufficient to permit lithium ions to diffuse into the surface of the glass in exchange for alkali metal ions of the glass.

The term "strain point" as recently redefined by the American Society for Testing Materials means that temperature at which glass has a viscosity of $10^{14.5}$ poises and "softening point" means the temperature at which glass has a viscosity of $10^{7.6}$ poises, Jour. Am. Cer. Soc., vol. 14, pages 502–511 (1931).

It is known that the alkali metals, lithium, sodium, and potassium, in the composition of a glass, are to some extent at least ionized at room temperature and that such ionization and the mobility of such ions in the network of the glass are increased by an increase in the temperature of the glass. When an article of glass containing $Na_2O$ or $K_2O$, therefore, is brought into contact with a low melting lithium salt, as for example, by dipping it in molten lithium nitrate (melting point 255° C.) at a temperature below the strain point of the glass, an exchange of alkali metal ions between the glass and the molten salt occurs and lithium ions migrate or diffuse into the glass in exchange for sodium or potassium ions. Since the radius of the lithium ion is less than that of either the sodium or potassium ion, such exchange of ions establishes tensional stress in the surface of the glass article which results in minute checks or cracks in its surface and ultimately causes breakage thereof.

The present invention is predicated upon our several discoveries, among which is first, that such stress and breakage are prevented if the article during such ion exchange is maintained at a temperature above its strain point, and second, that the amount of lithium exchanged is the molar equivalent of the amount of sodium and potassium displaced thereby. (To avoid deformation of the article by such heating, its temperature during the process should not, except briefly, substantially exceed its softening point.) The weight of lithium thus introduced into the glass, computed as $Li_2O$, is approximately one half the weight of the displaced $Na_2O$ plus one third the weight of the displaced $K_2O$. We have found that, as a result of such displacement and diminution in the weight percentage of alkali metal oxide in the glass, the thermal expansion coefficient of the portion of the glass in which such exchange has occurred is less than its original thermal expansion coefficient and, therefore, less than that of the glass in which such exchange has not occurred. Since, as we have further found, the ion exchange is progressive in character and moves inwardly from the surface, the glass article is thus provided with a surface layer having a lower thermal expansion coefficient than its interior.

From this it will be seen that an article composed of glass containing $Na_2O$ and/or $K_2O$, and having been treated by the new method, has a surface compressional layer which contains a lower weight percentage of $Na_2O$ and/or $K_2O$ and a higher weight percentage of $Li_2O$ than its interior but that the molar amount of the total alkali metal oxides is the same throughout the glass within the limits of the experimental errors encountered in its determination.

While a surface layer of extreme thinness so formed is effective to some extent, it is desirable to form surface layers at least 0.05 mm. and preferably at least 0.1 mm. in thickness, since such range of thickness usually encompasses the depth of the microscopic flaws, which normally are present in the surface of a glass article. Penetration by the lithium to a depth sufficient to encompass such flaws provides the maximum increase in strength for a given composition. A somewhat deeper penetration does no harm, however, provided that a substantial volume of the interior of the body of the glass remains unpenetrated by the lithium ions and that the resulting, internal, tensional counter-stress is not concentrated in an unduly small volume of the interior of the glass.

The optimum penetration by the lithium or the maximum increase of the tensile strength in a glass article treated by the new method depends upon the duration of the treatment and the temperature of the glass during treatment. While shorter times will produce higher tensile strengths than tempering or double gathering, we have found that maximum tensile strength may be attained by a time and temperature of treatment ranging from about 5 minutes at a temperature just below the softening point of the glass to more than 100 hours at a temperature just above its strain point.

A further important feature of our invention, which is instrumental in the attainment of surprisingly high tensile strengths, is based on our discovery that, in silicate glasses containing alumina, the lithium ions on diffusing into the glass will, under some conditions, react with the $Al_2O_3$ and $SiO_2$ in the glass and form finely divided crystals of beta-spodumene ($Li_2O.Al_2O_3.4SiO_2$) therein. This results in a further pronounced lowering of the thermal expansion coefficient of the portion of the glass in which such reaction has occurred, since beta-spodumene itself has a negative thermal expansion coefficient and, moreover, the reaction leaves the glass matrix of such portion with a lower content of alkali metal oxide and hence a lower thermal expansion coefficient than it would have had if the reaction and crystallization had not occurred.

Glasses in which such precipitation of beta-spodumene can occur and which are suitable for the production of articles of high tensile strengths by the new method comprise essentially 45% to 80% $SiO_2$, 8% to 15% $Na_2O$, and/or $K_2O$, and 7.5% to 25% $Al_2O_3$ the total of such oxides being at least 80%. In glasses of such range as well as those of the broader scope referred to above, other oxides commonly used in glass compositions for improving stability and imparting other desirable properties may be present, the necessary amounts for any desired property known to the art being well known to those skilled in the art of glass composition. Such oxides include the metals of the second periodic group, PbO, $B_2O_3$, $TiO_2$, $ZrO_2$, $Bi_2O_3$, $As_2O_3$, $Sb_2O_3$, fluorine and the various glass coloring oxides of V, Cr, Mn, Fe, Co, and Ni. The presence of $Li_2O$ in a percentage insufficient to cause the precipitation of beta-spodumene in the untreated interior portion of the article, say not over 2%, in the original composition of the glass is not objectionable and has the advantage of making the glass easier to melt.

Compositions which are particularly suitable for the production of glass articles having optimum chemical stability and the highest tensile strength according to the invention comprise essentially 55% to 66% $SiO_2$, 10% to 20% $Al_2O_3$, 10% to 13% $Na_2O$ and/or $K_2O$, 8% to 12% $TiO_2$, 2% to 5% $ZrO_2$, and about 2% $B_2O_3$.

While the formation of beta-spodumene in glasses containing sufficient $Al_2O_3$ will occur spontaneously at the surface of the glass, its formation within the surface depends upon the presence of a mineralizing agent in the glass to nucleate or initiate the crystallization, as well as upon the relative proportions of alkali metal oxide and $Al_2O_3$ in the glass composition. We have found that $TiO_2$ functions as a mineralizing agent and, when present in the glass in the amount of about 3% to 15% or more, it tends to form nuclei when the glass is cooled. Upon such nuclei beta-spodumene crystals form and grow, if and when lithium ions of the molten salt penetrate the glass, provided that the ratios of alkali metal oxide to $Al_2O_3$ and to $TiO_2$ are not too high, and that, when the alkali metal oxide is near the maximum of its range, the $Al_2O_3$ and also the $TiO_2$ are near their maxima. This is believed to be due to the fact that the essential nuclei of $TiO_2$ are soluble in, and do not form in the presence of, a sufficiently high concentration of alkali metal oxide. If the ratio of the weight percentage of the alkali metal oxide of the glass with respect to the $TiO_2$ is too high, therefore, the interior of the glass will remain clear and transparent and crystals of beta-spodumene will form only at its surface.

The glasses utilized in carrying out the new process, in which the ratio of alkali metal oxide to $TiO_2$ is not so large as to prevent the formation of $TiO_2$ nuclei, sometimes possess the characteristics of thermally opacifiable glasses and become internally translucent by precipitated $TiO_2$ when reheated either before or during the treatment with the lithium salt. Articles composed of such glass and containing sufficient $TiO_2$ and $Al_2O_3$ to cause crystallization of beta-spodumene, therefore, are translucent and possibly opaque depending upon the extent of precipitation, at least in the portion in which beta-spodumene has crystallized.

The maximum tensile strength which can be imparted to such an article, measured after abrasion thereof, exceeds 60,000 pounds per square inch. The attainment of such unusually high tensile strengths in such articles is due in part to the progressive character of the penetration of the lithium ions into the glass and the resulting absence of a sharp boundary for the farthest penetrated lithium and the beta-spodumene. The maximum displacement of $Na_2O$ and/or $K_2O$ by $Li_2O$ and the maximum crystallization of beta-spodumene occur nearest the surface of the glass and a gradation, therefore, exists between the lowest thermal expansion coefficient at the surface and the highest thermal expansion coefficient in the interior.

In a glass containing $Al_2O_3$ but no $TiO_2$, the crystallization of beta-spodumene occurs only at the surface of the article and the boundary between the low expansion surface and the high expansion interior of the glass is relatively sharp so that the surface of the article may spall when the stress at the interface exceeds its breaking strength. The breaking stress at the interface, however, is quite substantial since the maximum tensile strength of such articles is above 45,000 pounds per square inch.

Up to about 6,000 pounds per square inch of additional strength can be imparted to articles produced according to the invention by tempering them in known manner after their treatment with the lithium salt.

In carrying out the invention any salt or mixture of salts of lithium may be used which has a melting point below the softening point of the glass and which does not decompose at the temperature of the treatment sufficiently to make the molten salt alkaline enough to etch the glass objectionably. Few, if any, organic salts of lithium meet this requirement. Among the inorganic lithium salts, which alone or in combination have low enough melting points and are sufficiently stable at the temperature of the treatment, are lithium nitrate, lithium sulfate, lithium acid sulfate, lithium chloride, lithium bromide, and lithium iodide. Lithium nitrate and lithium acid sulfate have particularly low melting points and are suitable to be used with glasses of unusually low strain points. Lithium sulfate, which has a melting point above the softening points of some glasses may advantageously be mixed with another lithium salt, such as lithium chloride, to form either a eutectic mixture or one having an intermediate melting point. A tendency for decomposition of the salt, if not too pronounced, can be suppressed by enclosing the molten salt and maintaining the total partial pressures of the gaseous decomposition products at one atmosphere or more during the treatment of the glass article.

Advantageously, the lithium salt may be diluted with another salt which will not react objectionably with the lithium salt nor attack the glass, such as the sulfates, chlorides, and nitrates of calcium and magnesium. Such a dilution conserves the expensive lithium salts and we have found that as little as 1% by weight of the lithium salt in such a mixture is effective. With such small proportions of lithium salt, however, the reaction tends to become slower because fewer lithium ions are thereby available in the reaction zone at the surface of the glass.

In carrying out the method according to the invention it is preferable to melt the lithium salt in a suitable container, such as a container composed of stainless steel, and to maintain the molten salt at a temperature between the strain point and the softening point of the glass article to be treated. The article is preferably preheated and the portion to be treated is then dipped into the molten salt for the length of time necessary to bring about the desired exchange of lithium ions for the alkali metal ions of the glass, after which the article is removed and cooled and the salt adhering thereto is washed off. By this procedure it is not only possible to provide a preformed glass article of any shape with a circumambient surface layer of compressional stress by completely immersing it in the molten salt but it is also possible to restrict the compressional stress to a selected portion of the surface of the article by bringing only that portion into contact with the molten salt. Due to the fact that the diffusion of lithium ions occurs to a small extent parallel with the surface as well as perpendicular to it, the boundary between the treated and untreated portions is not sharp enough to cause ring-off or splitting between the portions. Such procedure, therefore, is useful when it is desired, for example, to strengthen only the rim of a container such as a tea cup or a tumbler.

The following compositions, in parts by weight as calculated to the oxide basis from their batches, illustrate glasses which may be used in carrying out the new method.

|  | 1 | 2 | 3 | 4 | 5 | 6 | 7 | 8 | 9 | 10 | 11 |
|---|---|---|---|---|---|---|---|---|---|---|---|
| $SiO_2$ | 52.5 | 73 | 60 | 66 | 60.5 | 62 | 59.3 | 56.5 | 62 | 48 | 68.4 |
| $Al_2O_3$ | 20 | 1 | 20 | 8 | 20 | 15 | 16 | 16 | 10 | 20 | 3 |
| $Na_2O$ | 13 | 17 | 20 | 11 | 13 | 13.5 | 10.2 | 13 | 9 | 10 | 13 |
| $K_2O$ |  |  |  | 3 |  |  | 3.5 | 3 |  |  | 3 |
| $Li_2O$ | 1 |  |  | 1 | 1 | 1 | 1 | 1 | 1 | 1 |  |
| $TiO_2$ | 10 |  |  |  |  | 2 |  | 3 | 10 | 13 | 15 |
| $B_2O_3$ | 2 |  |  |  |  | 2 |  | 2 | 2 |  | 15 |
| $MgO$ |  | 4 |  |  |  |  | 4 | 4 |  |  |  |
| $CaO$ |  | 5 |  |  |  |  |  |  |  |  |  |
| $BaO$ |  |  |  | 9 |  |  |  |  |  |  |  |
| $ZrO_2$ |  |  |  |  |  |  |  |  |  | 5 |  |
| $F$ |  |  |  | 2 | 0.5 |  |  | 0.5 | 0.5 |  |  |
| $As_2O_3$ | 1 |  |  |  | 1 | 1 |  | 1 | 1 |  | 0.3 |
| $Sb_2O_3$ |  |  |  |  |  |  |  |  |  |  | 0.3 |

The $Li_2O$ content of such glasses is too low per se to cause crystallization of beta-spodumene.

Abraded rods composed of the above compositions possess tensile strengths amounting to 5,000–7,000 pounds per square inch. While only a few scratches suffice to make the initial strengths of the rods comparable, sufficient abrasion is insured by rubbing them both lengthwise and round about with 150 grit emery abrasive cloth so as to produce on the surface a multiplicity of visible criss-cross scratches. When similar rods, prior to being abraded, are treated according to the hereinbefore described method, however, they undergo a very substantial increase in their tensile strengths as is shown by the following examples.

Example 1

Glass rods composed of composition 1 were immersed for ten minutes in a molten salt bath composed of 80 parts by weight $Li_2SO_4$, 9 parts by weight $CaSO_4$ and 11 parts by weight $MgSO_4$ heated at a temperature of 825° C. They were then allowed to cool freely in air. The surfaces of the rods, which were in compression as a result of the $Li_2O$ introduced therein from the molten lithium salt, were rendered opaque by precipitated beta-spodumene and their interiors were made translucent by precipitated $TiO_2$. The substantially low ratio of $Na_2O$ to $Al_2O_3$ and $TiO_2$ resulted in substantially maximum precipitation of beta-spodumene within the surface of the glass by the $Li_2O$ and the average abraded tensile strength of the rods was 75,000 pounds per square inch, an increase of 1150%.

The displacement of sodium and/or potassium ions by lithium ions, that is to say the concentration of $Li_2O$, as pointed out above, is greatest at the surface of the glass and progressively diminishes inwardly from the surface. The crystallization of beta-spodumene, which depends upon the concentration of $Li_2O$ and $Al_2O_3$, diminishes in like manner but does not extend as far inwardly as the lithium penetration. The boundary of the lithium penetration is not sharp and its depth cannot be exactly determined, although it can be approximately calculated from the resulting stress pattern. For practical purposes the farthest inward extent of the observable beta-spodumene crystals can be measured microscopically and, beyond this, the farthest penetration of sufficient lithium to effect a visible change in the refractive index of the glass can also be measured.

For example, an article composed of composition 1, when immersed for 30 minutes in a molten mixture consisting of 34% $Na_2SO_4$, 6% $LiCl$, and 60% $Li_2SO_4$ by weight at 816° C. and thereafter examined microscopically in a thin polished section ½ mm. thick, showed that the maximum depth of the beta-spodumene crystals was about 0.06 mm. while the demarcation of the change in the refractive index was about 0.6 mm. from the surface. Generally speaking, the average depth of penetration of lithium into the glass rods described in the following examples is between 0.1 mm. and 1 mm.

Example 2

Glass rods composed of composition 2 were immersed for four hours in a molten salt bath composed of 60 parts by weight $CaCl_2$ and 40 parts by weight $LiCl$ heated to 575° C. They were then allowed to cool freely in air. Although some of the $Na_2O$ in the surface of the glass had been replaced by $Li_2O$ resulting in a compressional surface layer, the $Al_2O_3$ content was too small to permit precipitation of beta-spodumene. The rods, therefore, remained transparent throughout and their average abraded tensile strength was 22,000 pounds per square inch, an increase of about 260%.

Example 3

Glass rods composed of composition 3 were immersed for thirty minutes in a molten salt bath having the composition set forth in Example 2 heated to a temperature of 600° C. They were then allowed to cool freely in air. The surfaces of the rods were translucent due to precipitation of beta-spodumene and their interior portions remained transparent. Their average abraded tensile strength was 24,000 pounds per square inch, an increase of 300%.

Example 4

Glass rods composed of composition 4 were immersed for fifteen hours in a molten salt bath composed of 63 parts by weight $Li_2SO_4$, 14 parts by weight $K_2SO_4$ and 23 parts by weight $Na_2SO_4$ heated at 550° C. They were then allowed to cool freely in air. They remained transparent throughout as in Example 2. The average abraded tensile strength was 20,000 pounds per square inch, an increase of about 230%.

Example 5

Glass rods composed of composition 5 were immersed for ten minutes in a molten salt bath having the composition set forth in Example 1 heated to 825° C. They were then allowed to cool freely in air. Their surfaces, which were in compression, were opaque due to the precipitation of beta-spodumene and their interior portions were transparent, since the amount of $TiO_2$ relative to $Na_2O$ is too small to cause precipitation of $TiO_2$. Their average abraded tensile strength was 23,000 pounds per square inch, an increase of about 280%.

Example 6

Glass rods composed of composition 6 were immersed for fifteen minutes in a molten salt bath composed of lithium chloride heated to 725° C. They were then allowed to cool freely in air. They remained transparent throughout as in Examples 2 and 4 and their average abraded tensile strength was 26,000 pounds per square inch, an increase of about 330%.

Example 7

Glass rods composed of composition 7 were immersed for thirty minutes in molten lithium chloride heated at 725° C. They were then allowed to cool freely in air. Their compressional surface layers were opaque due to the precipitation of beta-spodumene and their interior portions were substantially transparent as in Example 5. Due to the decreased ratio of alkali metal oxide to $TiO_2$ as compared with Example 5, their average abraded tensile strength was somewhat higher than that of Example 5 and amounted to 36,000 pounds per square inch, an increase of 500%.

Example 8

Glass rods composed of composition 8 were immersed for two minutes in a molten salt bath composed of lithium sulfate heated at 900° C. They were then allowed to cool freely in air. Their compressional surface layers were made opaque by precipitated beta-spodumene and their interiors translucent by precipitated $TiO_2$. Due to the relatively low ratio of $Na_2O$ to $Al_2O_3$ and $TiO_2$ their average abraded tensile strength was 63,000 pounds per square inch, an increase of 950%.

Example 9

Glass rods composed of composition 9 were immersed for thirty minutes in a molten salt bath composed of 50 parts by weight LiCl and 50 parts by weight NaCl heated at 750° C. They were then allowed to cool freely in air. As in Example 8 the compressional surface layers were opaque and the interiors were translucent. Due to a higher ratio of $Na_2O$ to $Al_2O_3$ than in Example 8 their average abraded tensile strength was 58,000 pounds per square inch, an increase of about 860%.

Example 10

Glass rods composed of composition 10 were immersed for thirty minutes in a molten salt bath having the composition set forth in Example 9 heated at 730° C. They were then allowed to cool freely in air. As in Example 9 the compressional surface layers were opaque and the interiors were translucent. The ratio of the alkali metal oxide to $Al_2O_3$, however, is lower than in Example 9 and the average abraded tensile strength was higher, amounting to 67,000 pounds per square inch, an increase of 1000%.

Example 11

Glass rods composed of composition 11, which is a boro-silicate, were immersed for two hours in a molten mixture composed of 72% $Li_2SO_4$ and 28% $K_2SO_4$ by weight at 590° C. They were then allowed to cool freely in air. Since they contained no $TiO_2$ and insufficient $Al_2O_3$ to form beta-spodumene at the surface of the glass, the rods remained transparent throughout. Their average abraded tensile strength was 18,800 pounds per square inch, an increase of about 210%.

What is claimed is:

1. The method of making a glass article of high mechanical strength which comprises providing an article of glass containing 45% to 80% $SiO_2$ and 7% to 25% of at least one alkali metal oxide selected from the group consisting of $Na_2O$ and $K_2O$, contacting the article while at a temperature above its strain point but below its softening point with a lithium salt, which will be molten but which will not decompose objectionably at such temperature, and maintaining the article in contact with the salt at said temperature for a time sufficient to permit lithium ions to diffuse into the surface of the glass in exchange for alkali metal ions of the glass.

2. The method of claim 1 in which the article subsequently is tempered by cooling it rapidly.

3. The method of making a glass article of high mechanical strength which includes providing an article of glass comprising by weight 45% to 80% $SiO_2$, 8% to 15% of at least one alkali metal oxide selected from the group consisting of $Na_2O$ and $K_2O$, and 7.5% to 25% $Al_2O_3$, the total of the $SiO_2$, alkali metal oxide and $Al_2O_3$ being at least 80%, contacting the article while at a temperature above its strain point but below its softening point with a lithium salt, which will be molten but which will not decompose objectionably at such temperature, and maintaining the article in contact with the salt at said temperature for a time sufficient to permit lithium ions to diffuse into the surface of the glass in exchange for alkali metal ions of the glass.

4. The method of claim 3 in which 3% to 15% $TiO_2$ is added to the glass composition and some of the diffused lithium ions are reacted with $Al_2O$ and $SiO_2$ of the glass to form crystallites of beta-spodumene.

5. The method of claim 4 in which the glass contains 55% to 66% $SiO_2$, 10% to 13% of at least one alkali metal oxide selected from the group consisting of $Na_2O$ and $K_2O$, 10% to 20 $Al_2O_3$, 8% to 12% $TiO_2$, 2% to 5% $ZrO_2$, and about 2% $B_2O_3$.

6. An article comprising a glass body containing 45% to 80% $SiO_2$ and 7% to 25% by weight of at least one alkali metal oxide selected from the group consisting of $Na_2O$ and $K_2O$, and having in at least a portion of its surface a compressional layer which contains a lower weight percentage of said alkali metal oxide and a higher weight percentage of $Li_2O$ than the interior of the glass body, the molar amount of the total alkali metal oxides being substantially the same throughout.

7. The article of claim 6 in which the glass contains 45% to 80% $SiO_2$, 8% to 15% of at least one alkali metal oxide selected from the group consisting of $Na_2O$ and $K_2O$, and 7.5% to 25% $Al_2O_3$, the total of said $SiO_2$, alkali metal oxide and $Al_2O_3$ being at least 80%.

8. The article of claim 7 in which the glass contains 3% to 15% $TiO_2$.

9. The article of claim 8 in which the glass contains 55% to 66% $SiO_2$, 10% to 13% of at least one alkali metal oxide selected from the group consisting of $Na_2O$ and $K_2O$, 10% to 20% $Al_2O_3$, 8% to 12% $TiO_2$, 2% to 5% $ZrO_2$, and about 2% $B_2O_3$.

10. The article of claim 8 in which the surface compressional layer contains crystals of beta-spodumene.

11. An article comprising a glass body containing 45% to 80% $SiO_2$, and 7% to 25% by weight of at least one alkali metal oxide selected from the group consisting of $Na_2O$ and $K_2O$, and having a circumambient surface compressional layer, which contains a lower weight percentage of said alkali metal oxide and a higher weight percentage of $Li_2O$ than the interior of the glass body, the molar amount of the total alkali metal oxides being substantially the same throughout.

12. The article of claim 11 in which the glass contains 45% to 80% $SiO_2$, 8% to 15% of at least one alkali metal oxide selected from the group consisting of $Na_2O$ and $K_2O$, and 7.5% to 25% $Al_2O_3$, the total of said $SiO_2$, alkali metal oxide and $Al_2O_3$ being at least 80%.

13. The article of claim 12 in which the glass contains 3% to 15% $TiO_2$.

14. The article of claim 13 in which the glass contains 55% to 66% $SiO_2$, 10% to 13% of at least one alkali metal oxide selected from the group consisting of $Na_2O$ and $K_2O$, 10% to 20% $Al_2O_3$, 8% to 12% $TiO_2$, 2% to 5% $ZrO_2$, and about 2% $B_2O_3$.

15. The article of claim 13 in which the surface compressional layer contains crystals of beta-spodumene.

References Cited in the file of this patent

UNITED STATES PATENTS 2,428,600   Williams _____ Oct. 7, 1947

OTHER REFERENCES

Williams and Weyl: "Surface Dealkalization of Finished Glassware," The Glass Industry, vol. 26, No. 6, June 1945.